US010069738B2

(12) United States Patent
Lawrence Lang et al.

(10) Patent No.: US 10,069,738 B2
(45) Date of Patent: Sep. 4, 2018

(54) ONE CELLULAR RADIO TO SUPPORT MULTIPLE PHONE LINES AND DATA AT A LOCATION

(71) Applicants: AT&T Intellectual Property I, L.P., Atlanta, GA (US); AT&T Mobility II LLC, Atlanta, GA (US)

(72) Inventors: Howard Lawrence Lang, Wayside, NJ (US); Steven Rocconi, Port Orchard, WA (US); James Compton, Elgin, IL (US); Rajeev Singh, Fairfax, VA (US); Vimal Patel, Morganville, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 221 days.

(21) Appl. No.: 14/676,523

(22) Filed: Apr. 1, 2015

(65) Prior Publication Data

US 2016/0294706 A1     Oct. 6, 2016

(51) Int. Cl.
*H04W 12/06*     (2009.01)
*H04L 12/851*    (2013.01)
(Continued)

(52) U.S. Cl.
CPC .......... *H04L 47/24* (2013.01); *H04L 63/0853* (2013.01); *H04L 69/08* (2013.01);
(Continued)

(58) Field of Classification Search
CPC .... H04W 84/14; H04W 12/06; H04L 12/851; H04L 29/06; H04L 47/24; H04L 63/0853; H04L 69/08
See application file for complete search history.

(56) References Cited

U.S. PATENT DOCUMENTS 5,799,254 A * 8/1998 Karmi ................... H04W 28/08
                                                           455/401
6,023,460 A * 2/2000 Jackson ................. H04W 84/16
                                                           370/330
(Continued)

FOREIGN PATENT DOCUMENTS

EP          2742659 A2    6/2014
WO          9935865 A1    7/1999
(Continued)

*Primary Examiner* — Edan Orgad
*Assistant Examiner* — Nourali Mansoury
(74) *Attorney, Agent, or Firm* — Amin, Turocy & Watson, LLP

(57) ABSTRACT

A single cellular radio is enabled to support multiple phone lines and data service. The system can be split into two parts: a telephone adapter that receives input from one or more phone lines, and a wireless hot spot communicably coupled to one or more telephone adapters that transmits communications associated with the phone lines and data service to the mobile network. The telephone adapter can include phone jacks, WiFi, and LAN connections and also some traffic management functionality that routes voice traffic to higher class of services than non-voice data. The wireless hotspot can then map communications with higher classes of service to dedicated bearers with guaranteed bitrates, and the lower classes of service to dedicated bearers with non-guaranteed bitrates or even default bearers.

20 Claims, 10 Drawing Sheets

(51) Int. Cl.
*H04L 29/06* (2006.01)
*H04W 88/08* (2009.01)
*H04W 88/06* (2009.01)
*H04W 80/04* (2009.01)

(52) U.S. Cl.
CPC ............ *H04W 12/06* (2013.01); *H04W 80/04* (2013.01); *H04W 88/06* (2013.01); *H04W 88/08* (2013.01)

(56) References Cited

U.S. PATENT DOCUMENTS

| | | | |
|---|---|---|---|
| 6,031,845 A * | 2/2000 | Walding | H04W 28/20 370/335 |
| 8,254,368 B2 | 8/2012 | Huber et al. | |
| 8,565,689 B1 | 11/2013 | Rubin et al. | |
| 8,576,781 B2 | 11/2013 | Lim et al. | |
| 8,660,103 B2 | 2/2014 | Suo et al. | |
| 8,787,308 B2 | 8/2014 | Yee | |
| 8,804,517 B2 | 8/2014 | Oerton | |
| 8,885,539 B2 | 11/2014 | Trudeau et al. | |
| 8,917,671 B2 | 12/2014 | Jing et al. | |
| 2001/0016504 A1 * | 8/2001 | Dam | H04W 16/28 455/562.1 |
| 2002/0018462 A1 * | 2/2002 | Thompson | H04W 72/04 370/352 |
| 2005/0075131 A1 * | 4/2005 | Palan | H04W 88/021 455/554.2 |
| 2009/0067417 A1 | 3/2009 | Kalavade et al. | |
| 2009/0164371 A1 * | 6/2009 | Arroyo | G06Q 20/0655 705/42 |
| 2009/0180430 A1 * | 7/2009 | Fadell | H04L 12/5695 370/329 |
| 2011/0019651 A1 | 1/2011 | Fulknier et al. | |
| 2012/0108250 A1 * | 5/2012 | Ahn | H04L 1/0002 455/450 |
| 2012/0300746 A1 | 11/2012 | Ibrahim et al. | |
| 2012/0303954 A1 * | 11/2012 | Ding | G06F 11/1469 713/165 |
| 2013/0016648 A1 | 1/2013 | Koskela et al. | |
| 2013/0077482 A1 | 3/2013 | Krishna et al. | |
| 2013/0172000 A1 | 7/2013 | Van et al. | |
| 2014/0018083 A1 | 1/2014 | Laraqui et al. | |
| 2014/0098671 A1 * | 4/2014 | Raleigh | H04M 15/80 370/235 |
| 2014/0132648 A1 | 6/2014 | Cui et al. | |
| 2014/0185580 A1 | 7/2014 | Fang et al. | |
| 2014/0206361 A1 * | 7/2014 | Centonza | H04W 76/045 455/444 |
| 2014/0213219 A1 | 7/2014 | Mohebbi | |
| 2014/0237534 A1 * | 8/2014 | Salinger | H04N 7/17318 725/116 |
| 2014/0243000 A1 | 8/2014 | Keevill et al. | |
| 2014/0243043 A1 | 8/2014 | Shen et al. | |
| 2014/0269488 A1 | 9/2014 | Hedstrom | |
| 2014/0269662 A1 | 9/2014 | Muhamed et al. | |
| 2015/0055490 A1 * | 2/2015 | Patil | H04W 24/08 370/252 |
| 2015/0103651 A1 * | 4/2015 | Kekki | H04W 28/0289 370/230 |
| 2016/0234715 A1 * | 8/2016 | Futaki | H04W 48/06 |
| 2017/0150429 A1 * | 5/2017 | Baldemair | H04W 48/16 |

FOREIGN PATENT DOCUMENTS

| | | | |
|---|---|---|---|
| WO | 2014000128 A1 | 1/2014 | |
| WO | 2014005324 * | 1/2014 | ............. H04W 8/20 |
| WO | 2014124666 A1 | 8/2014 | |

* cited by examiner

ONE CELLULAR RADIO TO SUPPORT MULTIPLE PHONE LINES AND DATA AT A LOCATION

TECHNICAL FIELD

The subject disclosure relates to a system that enables a single cellular radio to support multiple telephone lines and data usage in a mobile communications environment.

BACKGROUND

Multiple phone lines typically require a separate cellular radio and SIM card per phone line. Supporting multiple radio access channels is complex due to potential radio interference and intermodulation, and expensive due to the hardware requirements. Installing multiple cellular radios can be difficult too, as each radio has a separate antenna, and if the antennas are located remotely, extending cable between the cellular radio and the antennas can be costly.

DETAILED DESCRIPTION

Figure 1:
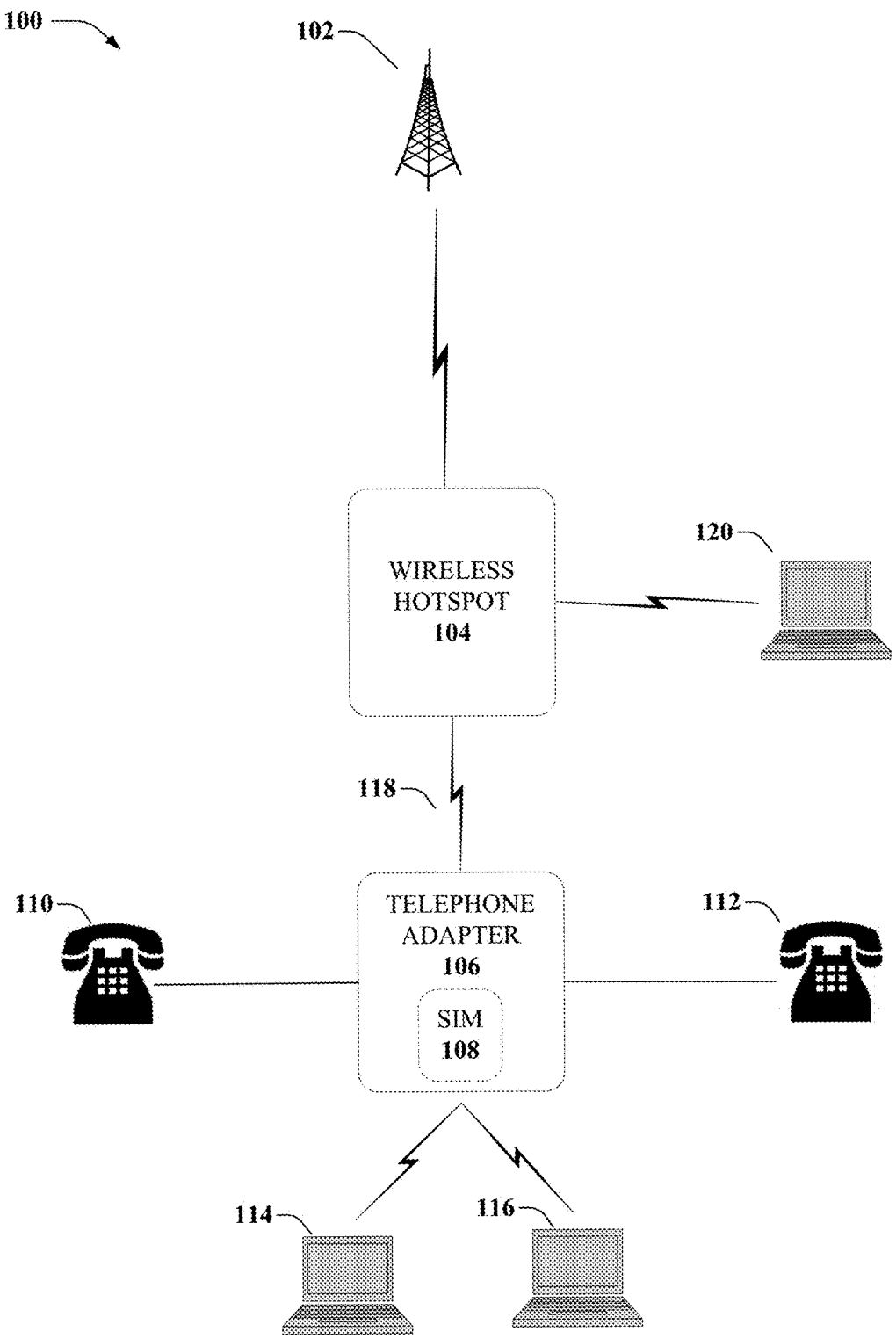
FIG. 1 is an example, non-limiting embodiment of a block diagram showing a telephone adapter and wireless hotspot supporting multiple phone lines in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A system is provided to enable single cellular radio to support multiple phone lines and data service. The system can be split into two parts: a telephone adapter that receives input from one or more phone lines, and a wireless hot spot device communicably coupled to one or more telephone adapters that transmits communications associated with the phone lines and data service to the mobile network. The telephone adapter can include phone jacks, WiFi, and LAN connections and also some traffic management functionality that routes voice traffic to higher class of services than non-voice data. The wireless hotspot device can then map communications with higher classes of service to dedicated bearers with guaranteed bitrates, and the lower classes of service to dedicated bearers with non-guaranteed bitrates or even default bearers.

In an embodiment, the telephone adapter can include a router which maps the voice traffic to a higher priority, such as Class of Service (COS) 1 or equivalent and the data/TCP traffic to a lower priority, such as COS 4 or equivalent. The wireless hotspot device can then send the COS1 data over a higher priority radio bearer such as QCI1. Bearers are virtual concepts which define how data between a mobile device and the packet data network gateway is treated. Some flows may receive preferential treatment such as guaranteed bit rate, while others flows, or bearers, might not have a guaranteed bitrate. An example of a higher priority bearer is QCI1 which is a high priority, guaranteed bitrate dedicated bearer on a cellular radio access network, to a base station device associated with the radio access network. The wireless hotspot device can send the internet/data traffic over a lower priority radio bearer such as QCI8 which is a non-guaranteed bitrate default bearer. If a number of active voice sessions increases beyond the capacity of the guaranteed bitrate of the QCI1 dedicated bearer, the wireless hotspot device can send a request to increase the guaranteed bit rate to accommodate the active voice sessions.

The wireless hotspot device can be located nearby the telephone adapter(s) and be communicably coupled to the telephone adapter(s) or can be remotely connected via a WiFi connection. With a split system, with a wireless hotspot device and telephone adapters, the wireless hotspot device can be located where the cellular signal is optimal. In other embodiments, the wireless hotspot device can send and receive signals to and from the mobile network via remote antennas.

For these considerations as well as other considerations, in one or more embodiments, a telephone adapter includes a processor and a memory that stores executable instructions that when executed by the processor, facilitate performance of operations, including receiving a first transmission corresponding to a telephone communication via a first telephone port and receiving a second transmission corresponding to another telephone communication via a second telephone port. The operations can also include combining the first transmission and the second transmission into a third transmission corresponding to a cellular protocol. The operations can further include directing the third transmission to a base station device via a radio device.

In another embodiment, a wireless hotspot device includes a processor and a memory that stores executable instructions that when executed by the processor, facilitate performance of operations including receiving a transmission comprising a first voice communication and a second voice communication, wherein the first voice communication and the second voice communication are respectively associated with a first telephone device and second telephone device. The operations can also include converting the transmission to a cellular transmission conforming to a cellular protocol. The operations can also include transmitting the cellular transmission to a base station device using a dedicated bearer.

In yet another embodiment, a method can include receiving, by a device comprising a processor, a transmission from a telephone adaptor, wherein the transmission comprises voice calls associated with respective telephone devices. The method can further include assigning, by the device, the voice calls to a dedicated bearer on a radio access network. The method can also include transmitting, by the device, the transmission to a base station device associated with the radio access network on the dedicated bearer.

Turning now to FIG. 1, illustrated is an example, non-limiting embodiment of a block diagram 100 showing a telephone adapter and wireless hotspot supporting multiple phone lines in accordance with various aspects described herein.

A telephone adapter 106 can be connected to telephone devices 110 and 112 via telephone ports on the telephone adapter 106. The telephone ports can be voice over IP ports supporting standard RJ11 jacks or other standard telephone/communications jacks. In some embodiments, the phone devices 110 and 112 can be connected via ethernet cables. Telephone adapter 106 can also provide data service for computing devices 114 and 116 via connected ethernet cables or via WiFi service.

Telephone adapter 106 can be communicably coupled to a wireless hotspot device 104 that transmits the voice and data sessions via a cellular radio to a mobile network via base station device 102. In some embodiments, wireless hotspot device 104 can also provide data connectivity via WiFi to one or more computing devices (e.g., computing device 120) in addition to supporting telephone adapter 106. In an embodiment, the telephone adapter 106 can also include RJ45 ports which allow computing devices to connect to the telephone adapter via physical ethernet connections. In an embodiment, the wireless hotspot device 104 can include dual band WiFi, with one band dedicated to providing data service to computing devices such as computing device 120 and another WiFi band dedicated telephone adapter 106. In a similar manner, telephone adapter 106 can include dual band WiFi, with one band for computing devices 114 and 116, and another band dedicated to communications with wireless hotspot device 104. Having separate bands for WiFi decreases interference and intermodulation, but in some embodiments, telephone adapter 106 and wireless hotspot device 104 can have single band WiFi antennas. In another embodiment, telephone adapter 106 can be communicably coupled to computing devices 114 and 116 via WiFi, ethernet cable, ethernet over powerline, or other suitable physical layer connections.

It is to be appreciated that the embodiment shown in FIG. 1 is merely an exemplary embodiment, and that in other embodiments, different configurations are possible. For instance, wireless hotspot device 104 can support more than one telephone adapter. Indeed, wireless hotspot device 104 can support any number of telephone adapters, but the number of active voice sessions may be limited by the bitrate of the dedicated bearer. Similarly, although FIG. 1 depicts three computing devices 114, 116, and 120, in other embodiments fewer than three, or more than three computing devices may be supported.

It is also to be appreciated that in one or more embodiments of the subject disclosure, telephone adapter 106 and wireless hotspot 104 may not have WiFi connections and/or may not support data service for computing devices 114, 116, and 120. In some embodiments, wireless hotspot device 104 and/or telephone adapter 106 may include WiFi capabilities, but based on service/subscription plans or feasibility/practicability concerns, the WiFi may be disabled either locally or remotely.

In an embodiment, the wireless hotspot device 104 can communicate with the mobile cellular network via either 3G or 4G (or higher) technology by switching to different codecs based on whether the cellular radio on wireless hotspot device 104 is communicating with the cellular base station device 102 via 3G or 4G (or higher). The number of active voice sessions supported by the wireless hotspot device 104 can be based on the type of active voice sessions. Telephone adapter 106 can connect with different types of telephone devices. For instance, telephone device 110 may be a circuit switched telephone device, while telephone device 112 may have voice over IP telephone calls. For example, voice over IP voice sessions may only require a 40 Kb/sec bitrate while circuit switched voice calls may require a higher bit rate.

In an embodiment, the telephone adapter 106 can include a subscriber identity module (SIM) 108 that facilitates communication and identification with the mobile network via base station device 102. Having the SIM card 108 coupled to the telephone adapter 106 allows a single cellular radio to support multiple phone lines, instead of having a SIM card on each phone device 110 and 112, which would then require separate cellular radios. In other embodiments, SIM 108 can be located in wireless hotspot device 104. In embodiment, each phone device 110 and 112 can be associated with virtual SIM cards in the 'cloud' while using SIM 108 to authorize/validate the communications with the base station device 102.

In an embodiment the wireless hotspot 104 can include a GPS receiver to determine the location of the wireless hotspot device 104 for emergency services related purposes (e.g., E911). The telephone adapter 106 and the wireless hotspot device 104 can be logically locked together so that telephone adapter 106 will only work with a wireless hotspot device 104. This ensures that a phone call received from a phone line supported by telephone adapter 106 has been placed at a location that has been identified by the wireless hotspot device in order to accurately provide and facilitate emergency services and other subscription and billing services.

Figure 2:
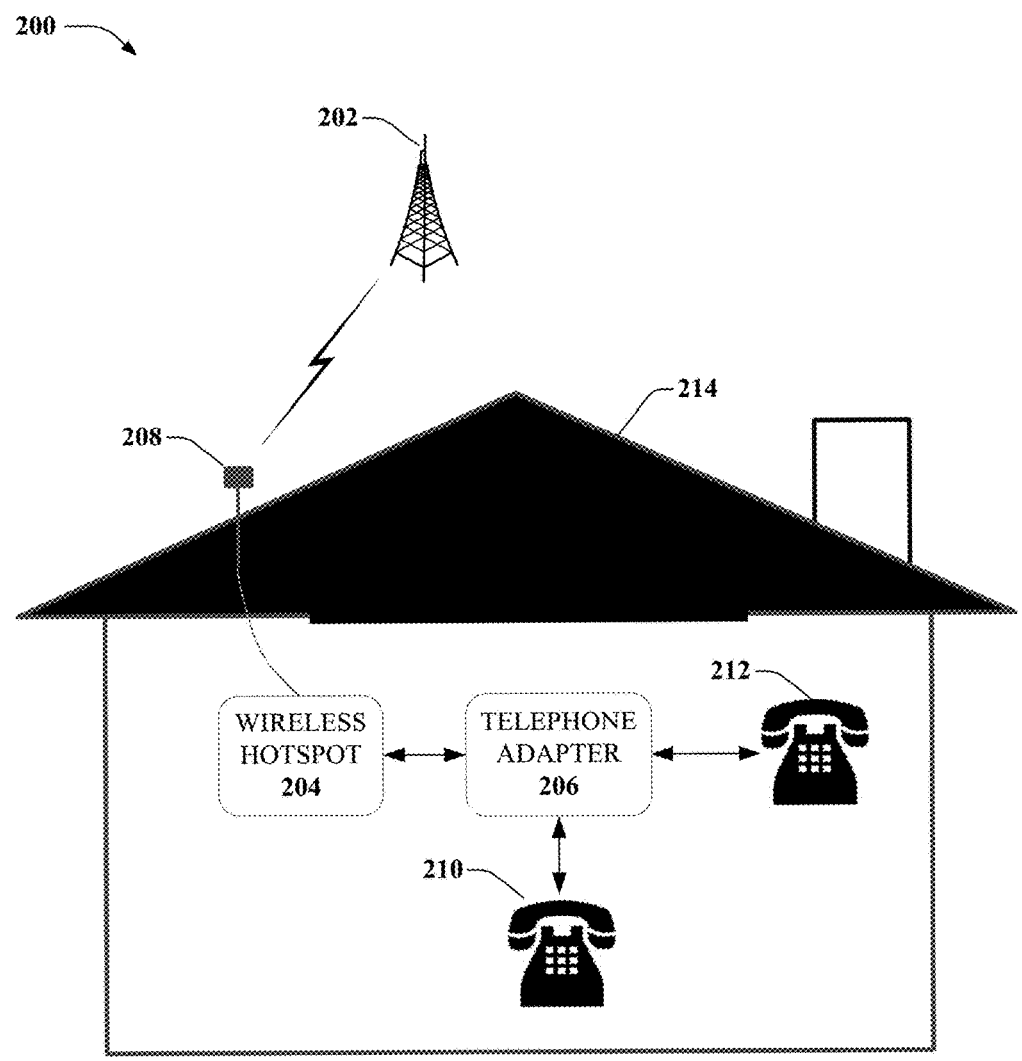
FIG. 2 is an example, non-limiting embodiment of a block diagram showing a wireless hotspot and telephone adapter co-located in a building in accordance with various aspects described herein.

Turning now to FIG. 2, illustrated is an example, non-limiting embodiment of a block diagram 200 showing a wireless hotspot and telephone adapter co-located in a building in accordance with various aspects described herein. Telephone adapter 206 and wireless hotspot 204 can be colocated next to or near each other within a building 214. Telephone adapter 206 can be connected to telephone devices 212 and 210 via telephone ports (e.g., RJ11ports) and pass transmissions from the telephone devices 210 and 212 to a wireless hotspot device 204 which transmits the signals to a base station device 202 associated with a mobile network via an antenna 208.

In an embodiment, the telephone adapter 206 and the wireless hotspot device 204 can be located close enough to each other that an ethernet cable can be connected between the two devices to pass the voice and data communications. In other embodiments, even though the devices are relatively close to each other, the wireless hotspot device 204 and the telephone adapter 206 can communicate wirelessly via a logically locked WiFi connection.

It is to be appreciated that the embodiment shown in FIG. 2 is merely an exemplary embodiment, and that in other embodiments, different configurations are possible. For instance, wireless hotspot device 204 can support more than one telephone adapter. Indeed, wireless hotspot device 204 can support any number of telephone adapters, but the number of active voice sessions may be limited by the bitrate of the dedicated bearer, which is the logical pipeline in the cellular connection between the wireless hotspot device 204 and the base station device 202. Similarly, although FIG. 2 depicts the telephone adapter 206 supporting two phone lines, in other embodiments more than two computing devices may be supported. Additionally, in other embodiments, each of the wireless hotspot device 204 and the telephone adapter can support one or more active data sessions with computer devices.

In some embodiments, the telephone adapter 206 can connect to the telephone devices 210 and 212 via a WiFi connection, especially in cases when the telephone device 210 and 212 are VoIP capable devices.

Antenna 208 can be provided to provide the wireless hotspot device 204 with a better cellular signal connection with base station device 202. This may be necessary in cases where building 214 or the facility/location in which the wireless hotspot device 204 is located provides a poor signal. In some embodiments, if the cellular signal is strong enough, wireless hotspot device 204 can include an antenna and transmit directly to the base station device 202.

Figure 3:
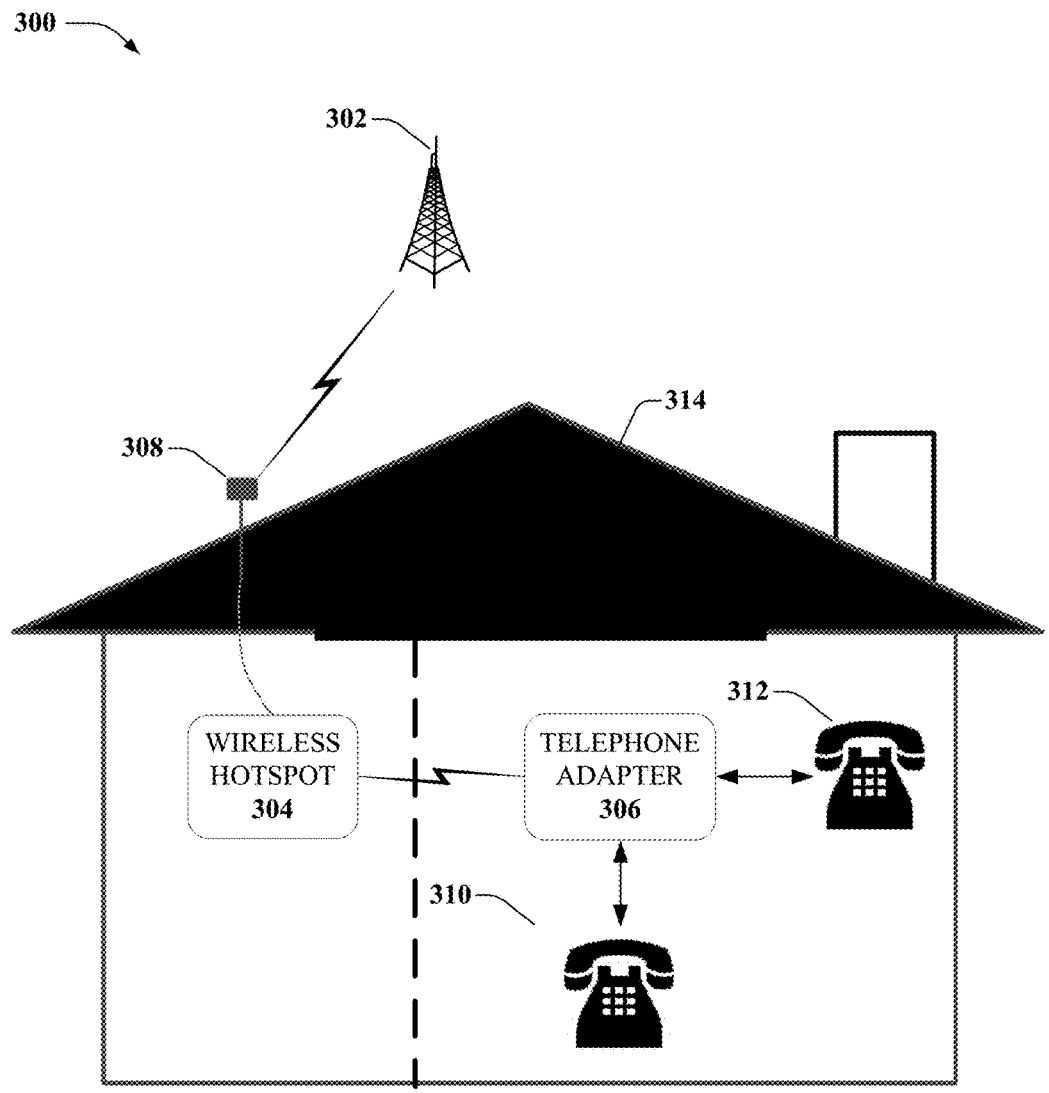
FIG. 3 is an example, non-limiting embodiment of a block diagram showing a wireless hotspot and telephone adapter remotely located in a building in accordance with various aspects described herein.

Turning now to FIG. 3, illustrated is an example, non-limiting embodiment of a block diagram 300 showing a wireless hotspot and telephone adapter remotely located in a building in accordance with various aspects described herein Telephone adapter 306 and wireless hotspot 304 can be located remotely from each other within a building 314. Telephone adapter 306 can be connected to telephone devices 312 and 310 via telephone ports (e.g., RJ11ports) and pass transmissions from the telephone devices 310 and 312 to a wireless hotspot device 304 which transmits the signals to a base station device 302 associated with a mobile network via an antenna 308.

In an embodiment, the telephone adapter 306 and the wireless hotspot device 204 can be located in separate parts of the building 314 such that running an ethernet cable between the two devices may be impossible, impracticable, or expensive. This can happen if the location where the telephone adapter is located, which may need to be relatively close to where the telephone devices 310 and 312 are located, may not receive a sufficient cellular signal to communicate with base station device 302. It is also possible that the wireless hotspot device 304 may be supporting multiple telephone adapters and may need to be centrally located. Wireless hotspot device 304 and telephone adapter 306 can therefore communicate with each other via a logically locked wireless signal (e.g., WiFi, or other short/medium range wireless telecommunication technology).

It is to be appreciated that the embodiment shown in FIG. 3 is merely an exemplary embodiment, and that in other embodiments, different configurations are possible. For instance, wireless hotspot device 304 can support more than one telephone adapter. Indeed, wireless hotspot device 304 can support any number of telephone adapters, but the number of active voice sessions may be limited by the bitrate of the dedicated bearer, which is the logical pipeline in the cellular connection between the wireless hotspot device 304 and the base station device 302. Similarly, although FIG. 3 depicts the telephone adapter 306 supporting two phone lines, in other embodiments more than two computing devices may be supported. Additionally, in other embodiments, each of the wireless hotspot device 304 and the telephone adapter can support one or more active data sessions with computer devices.

Figure 4:
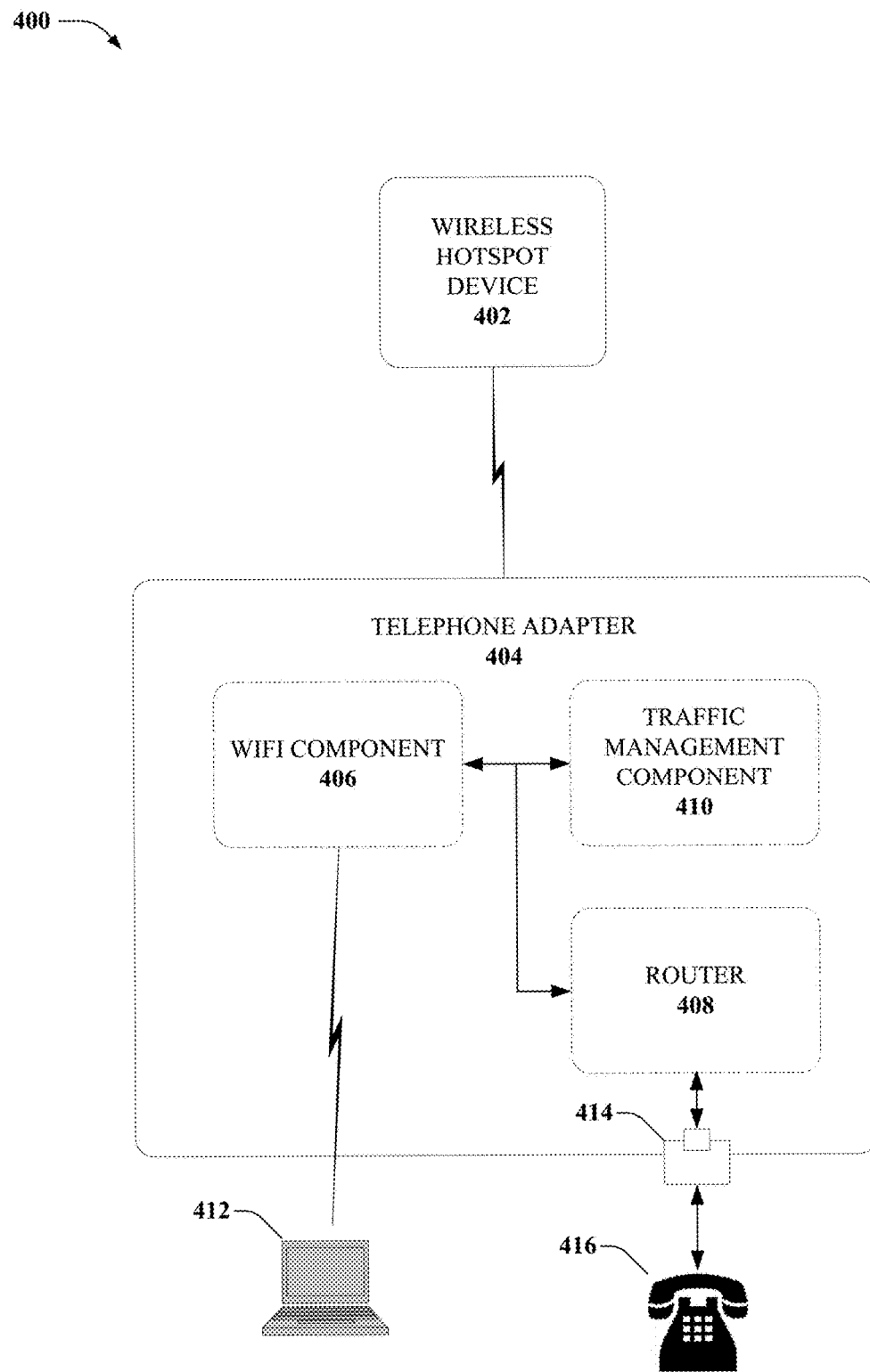
FIG. 4 is an example, non-limiting embodiment of a block diagram showing a telephone adapter in accordance with various aspects described herein.

Turning now to FIG. 4, illustrated is an example, non-limiting embodiment of a block diagram 400 showing a telephone adapter 404 in accordance with various aspects described herein. Telephone adapter 404 can receive voice communications from a telephone device (e.g., telephone 416) and then pass the communications to a wireless hotspot device 402 which forwards the communications to a cellular network via a base station device. Telephone adapter 404 can be connected to the telephone device 416 via a telephone port 414 that can support regular phone lines (e.g., RJ11, RJ14, RJ25, etc) or can be connected to VoIP enabled phones via an ethernet port (e.g., RJ45, etc). In some embodiments, telephone 416 can be communicably coupled to the telephone adapter 404 via WiFi component 406.

WiFi component 406 can also provide data communication service for one or more computing devices (e.g., computing device 412). WiFi component 406 can also transmit the voice and data communications to the wireless hotspot device 402. In an embodiment, WiFi component 406 can be dual band, with one band dedicated to communications with the wireless hotspot device 402 and the other band dedicated to providing data service to one or more computing devices (e.g., computing device 412). Having two bands can decrease interference and intermodulation. In other embodiments, WiFi component 406 can be single band. In other embodiments, the computing device 412 can be coupled to the telephone adapter via an ethernet line and RJ45 type port.

The router 408 can be configured to direct the forwarding of packets associated with the voice and data communications to the wireless hotspot device 402. The router 408 can handle both circuit switched voice communications and voice over IP based phone calls. The router can also identify the source and type of communication of each active session, whether it is a realtime voice session, or a data session, and traffic management component 410 can map the communication to one or more different class of services which indicated the priority of the data. For instance, real-time active voice sessions can be mapped to Class Of Service 1 which is a high priority class of service, while data or TCP traffic can be mapped to Class of Service 4. In an embodiment, the traffic management component 410 can be a part of router 408 or in other embodiments can be a separate component.

WiFi component 406 or router 408 can be logically locked to wireless hotspot device 402 such that telephone adapter 404 will only work with wireless hotspot device 402 and not other wireless hotspot devices. The locking can be achieved through the use of linking the MAC addresses of each device. The locking can also be performed remotely in some embodiments.

The router 408 can in embodiment associate each active voice session with a virtual SIM, such that each phone line can have a number provided by the mobile network operator that does not require a SIM card to connect phone calls to each telephone device. The virtual SIMs can be provided by the mobile network, and router 408 can assign each virtual SIM to a phone line.

Figure 5:
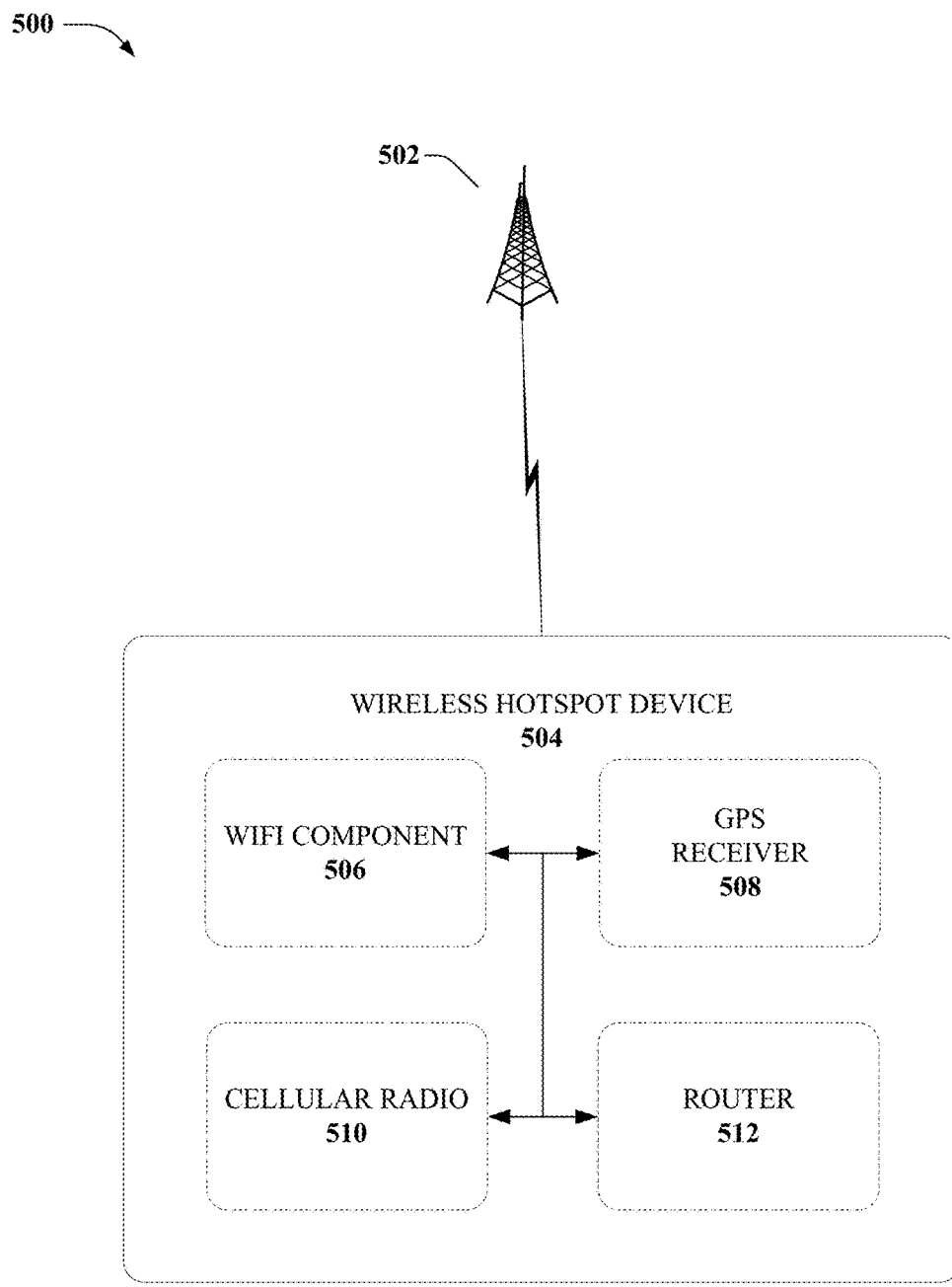
FIG. 5 is an example, non-limiting embodiment of a block diagram showing a wireless hotspot in accordance with various aspects described herein.

Turning now to FIG. 5, illustrated is an example, non-limiting embodiment of a block diagram 500 showing a wireless hotspot 504 in accordance with various aspects described herein. Wireless hotspot device 504 can receive transmissions from a telephone adapter (e.g., telephone adapter 404) and then forward the transmissions to a base station device 502 associated with a mobile network via a cellular radio 510 on the wireless hotspot device 504. Wireless hotspot device 504 can receive transmissions from the telephone adapter via a WiFi component 506. WiFi component 506 can receive both voice and data communications from the telephone adapter and in some embodiments, WiFi component 506 can also receive data transmissions (e.g., TCP) from one or more computing devices directly (i.e., both the telephone adapter and the wireless hotspot device 504 can be WiFi hotspots for WiFi enabled computing devices.

It is to be appreciated that while WiFi is mentioned throughout this specification, the embodiments are not limited to WiFi, but that various short to medium range data communication technologies can be implemented, including but not limited to WiFi IEEE 802.11a/b/g/n/ac and etc, WiMAX IEEE 802.16, Bluetooth, and a variety of other communications technologies and protocols.

In an embodiment, the wireless hotspot device 504 can communicate with the mobile network via the cellular radio 510 which can use 3G or 4G or higher technology, or even technologies not yet developed (5G, 6G, etc) by switching to different codecs and communications protocols based on whether the cellular radio 510 is communicating with the base station device 502 via 3G or 4G or higher. The number of active voice sessions supported by the wireless hotspot device 504 can be based on the type of active voice sessions. The router 512 can determine the class of service of the incoming voice and data sessions from the telephone adapter and can then map the sessions to dedicated or default bearers based on the class of service. For instance, the router 512 can direct the cellular radio 510 to send the COS1 data over QCI1, which is a high priority, guaranteed bitrate dedicated bearer on a radio access network, to the base station device 502. The router 512 can direct the cellular radio 510 to send the COS4 data over a lower priority default bearer such as QCI8. If a number of active voice sessions increases beyond the capacity of the guaranteed bitrate dedicated bearer (e.g., QCI1 bearer), the wireless hotspot device can send a request to increase the guaranteed bit rate to accommodate the active voice sessions. Similarly, if the number of active voice sessions decrease, the router 512 via cellular radio 510 can request a decrease in the QCI1 guaranteed bitrate.

In an embodiment, the wireless hotspot device 504 can also include a subscriber identity module (SIM) that facilitates communication and identification with the mobile network via base station device 502. Having the SIM card coupled to the cellular radio in wireless hotspot device 504 can allow the single cellular radio 510 to support multiple active voice sessions/phone lines, instead of having a SIM card on each phone device, which would then require separate cellular radios.

In an embodiment the wireless hotspot 504 can include a GPS receiver 508 to determine the location of the wireless hotspot device 504 for emergency services related purposes (e.g., E911). The telephone adapter and the wireless hotspot device 504 can be logically locked together so that telephone adapter will only work with a wireless hotspot device 504. This ensures that a phone call received from a phone line supported by telephone adapter has been placed at a location that has been identified by the wireless hotspot device 504 in order to accurately provide and facilitate emergency services and other subscription and billing services. In an embodiment, the GPS receiver 508 can determine the location when the service is being established, or can determine the location at predetermined intervals (e.g., every hour, once a day, etc).

Figure 6:
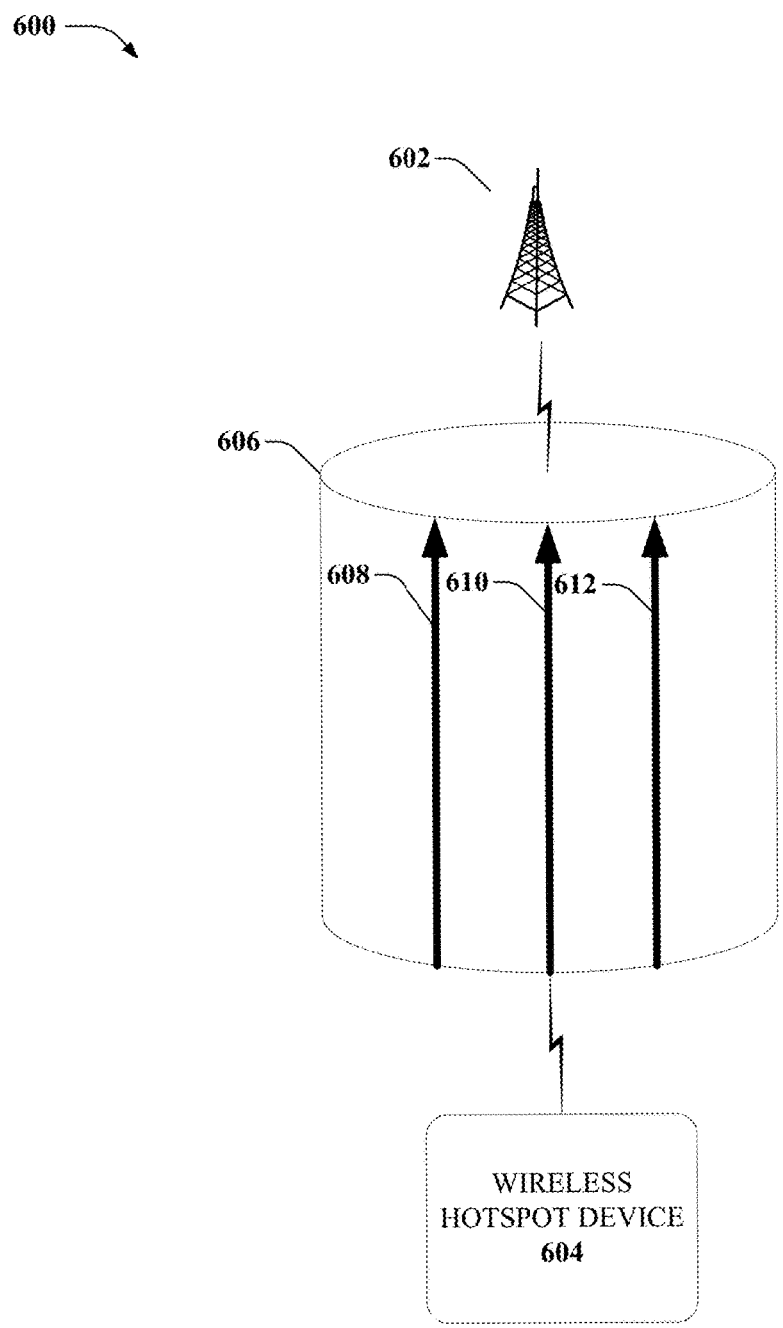
FIG. 6 is an example, non-limiting embodiment of a block diagram showing bearers in a radio access network in accordance with various aspects described herein.

Turning now to FIG. 6, illustrated is a an example, non-limiting embodiment of a block diagram 600 showing bearers in a radio access network in accordance with various aspects described herein. When wireless hotspot device 604 transmits and/or receives one or more active voice and/or data sessions to and from a cellular base station device 602, the wireless hotspot device 604 can assign the sessions to one or more dedicated or default bearers 608, 610, and/or 612 in a radio access network 606. Bearers are logical connections between the wireless hotspot device 604 and the cellular base station device 602 and can be used to classify the quality of service provided to each active session. Real-time voice sessions can be afforded a higher quality of service by assigning the active voice sessions to a QCI1 bearer (e.g., bearer 608), which is a dedicated bearer with a guaranteed bit rate. Other types of traffic, such as non-voice TCP data traffic can be assigned to a QCI8 bearer (e.g., 610) which is a bearer with a non-guaranteed bitrate. Other traffic can be assigned to default bearer 612 that also has a non-guaranteed bitrate.

In an embodiment, if there is a change in the number of active voice sessions, wireless hotspot device 604 can request a modification in the guaranteed bitrate bearer 608 (e.g., QCI1 bearer). For instance, if the guaranteed bit rate is 400 kB/second, and there are 10 VoIP or voice over LTE voice sessions that each may require a 40 kB channel, if there is an increase to 11 VoIP or VoLTE sessions, then the wireless hotspot device 604 can request an increase to 440 kB/sec or higher. As the number of active voice sessions decrease, the guaranteed bit rate can also correspondingly decrease. Since different types of voice sessions require different amounts of data and bitrates, VoIP, circuit switched etc, wireless hotspot device 604 can monitor the voice sessions, types of voice sessions, and then request modifications accordingly.

In an embodiment, the radio access network can dynamically allocate high priority QCI1 voice traffic based on requests from the wireless hotspot device 604. Wireless hotspot device 604 can request bandwidth to support the current number of voice connections plus additional bandwidth to support one or more voice connections. In this way, as additional voice connections are made, there is sufficient bandwidth right away for these connections, without having to wait for the bandwidth to be allotted. Additionally, by requesting bandwidth for the current connections plus one, the amount of bandwidth being reserved would be limited, unlike in the case of fixed provisioning where the wireless hotspot device 604 might have reserved a permanent amount of bandwidth, regardless of amount of active voice traffic.

Figure 7:
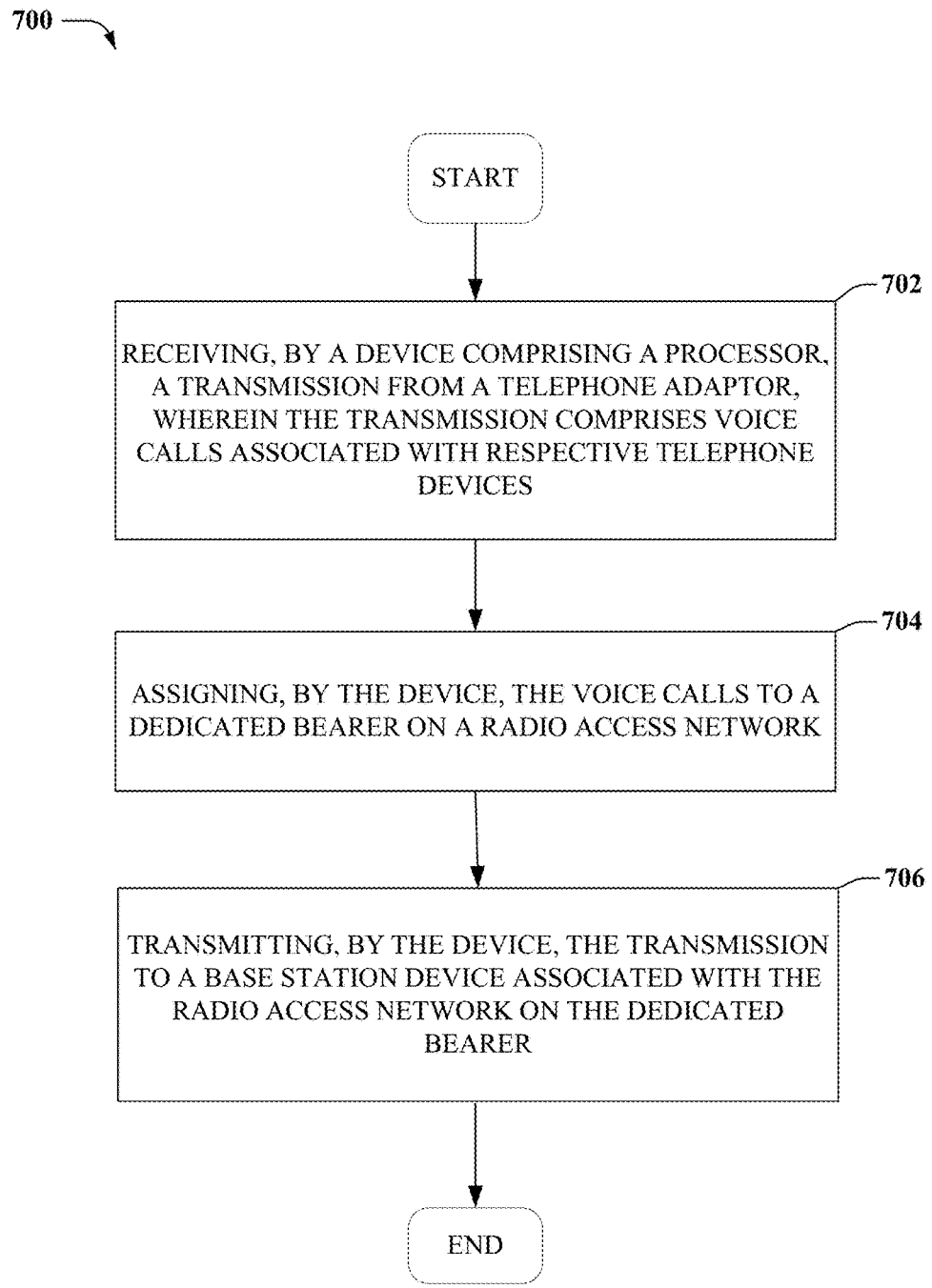
FIG. 7 illustrates a flow diagram of an example, non-limiting embodiment of a method for supporting multiple phone lines as described herein.
Figure 8:
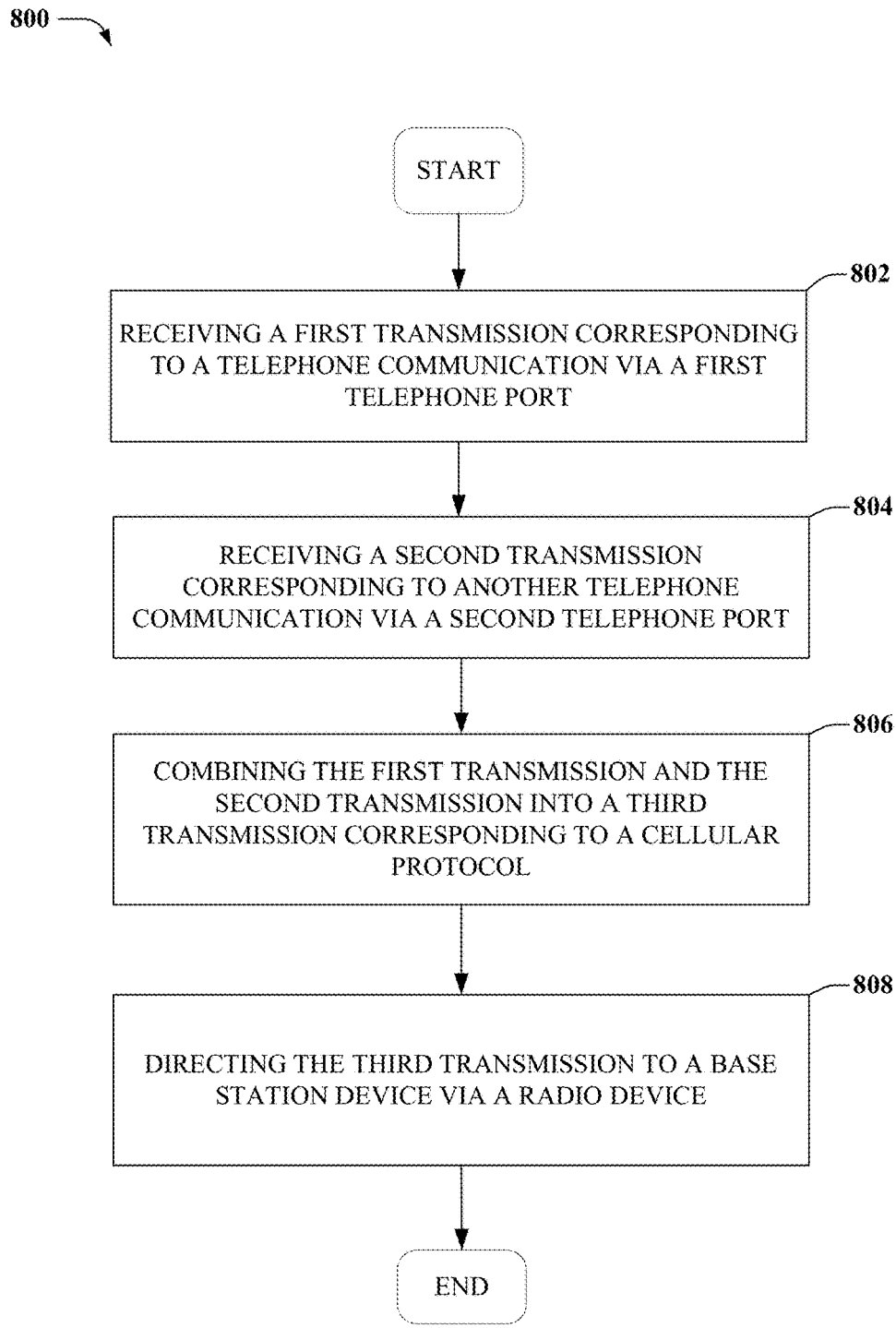
FIG. 8 illustrates a flow diagram of an example, non-limiting embodiment of a method for supporting multiple phone lines as described herein.

FIGS. 7-8 illustrates a process in connection with the aforementioned systems. The process in FIGS. 7-8 can be implemented for example by systems 100-600 as illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 a flow diagram of an example, non-limiting embodiment of a method for supporting multiple phone lines as described herein. The method 700 can start at 702 where the method includes receiving, by a device comprising a processor, a transmission from a telephone adaptor, wherein the transmission comprises voice calls associated with respective telephone devices, (e.g., by wireless hotspot 104, 204, 304, etc). Wireless hotspot device can receive transmissions from the telephone adapter via a WiFi antenna. WiFi antenna can receive both voice and data communications from the telephone adapter and in some embodiments, WiFi antenna 506 can also receive data transmissions (e.g., TCP) from one or more computing devices directly (i.e., both the telephone adapter and the wireless hotspot device can be WiFi hotspots for WiFi enabled computing devices.

The method can continue at 704, where the method includes assigning, by the device, the voice calls to a dedicated bearer on a radio access network. (e.g., by router 512). Real-time voice sessions can be afforded a higher quality of service by assigning the active voice sessions to a QCI1 bearer which is a dedicated bearer with a guaranteed bit rate. Other types of traffic, such as non-voice TCP data traffic can be assigned to a QCI8 bearer which is a bearer with a non-guaranteed bitrate. Other traffic can be assigned to default bearer that also has a non-guaranteed bitrate.

At 706, the method includes transmitting, by the device, the transmission to a base station device associated with the radio access network on the dedicated bearer. (e.g., by cellular radio 510).

FIG. 8 illustrates a flow diagram of an example, non-limiting embodiment of a method for supporting multiple phone lines as described herein. The method 800 can start at 802 wherein the method includes receiving a first transmission corresponding to a telephone communication via a first telephone port. At 804, the method can include receiving a second transmission corresponding to another telephone communication via a second telephone port. At 806 the method can include combining the first transmission and the second transmission into a third transmission corresponding to a cellular protocol. At 808, the method can include directing the third transmission to a base station device via a radio device.

Figure 9:
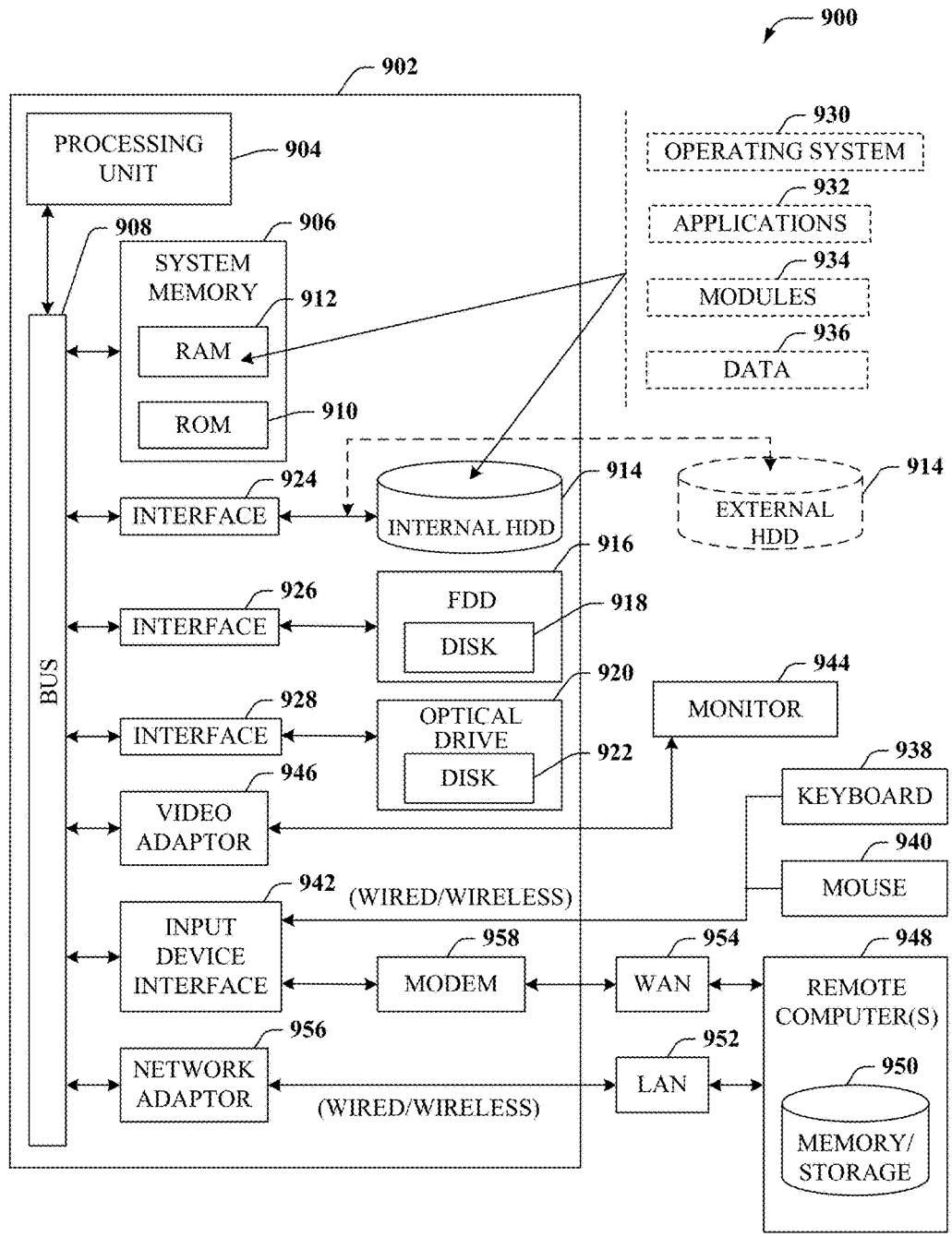
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 100, 200, 300, 400, 500, and/or 600.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). In other embodiments, the hard disk drive 914 can be a solid state drive. The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as Solid State Drive (SSD), zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

Figure 10:
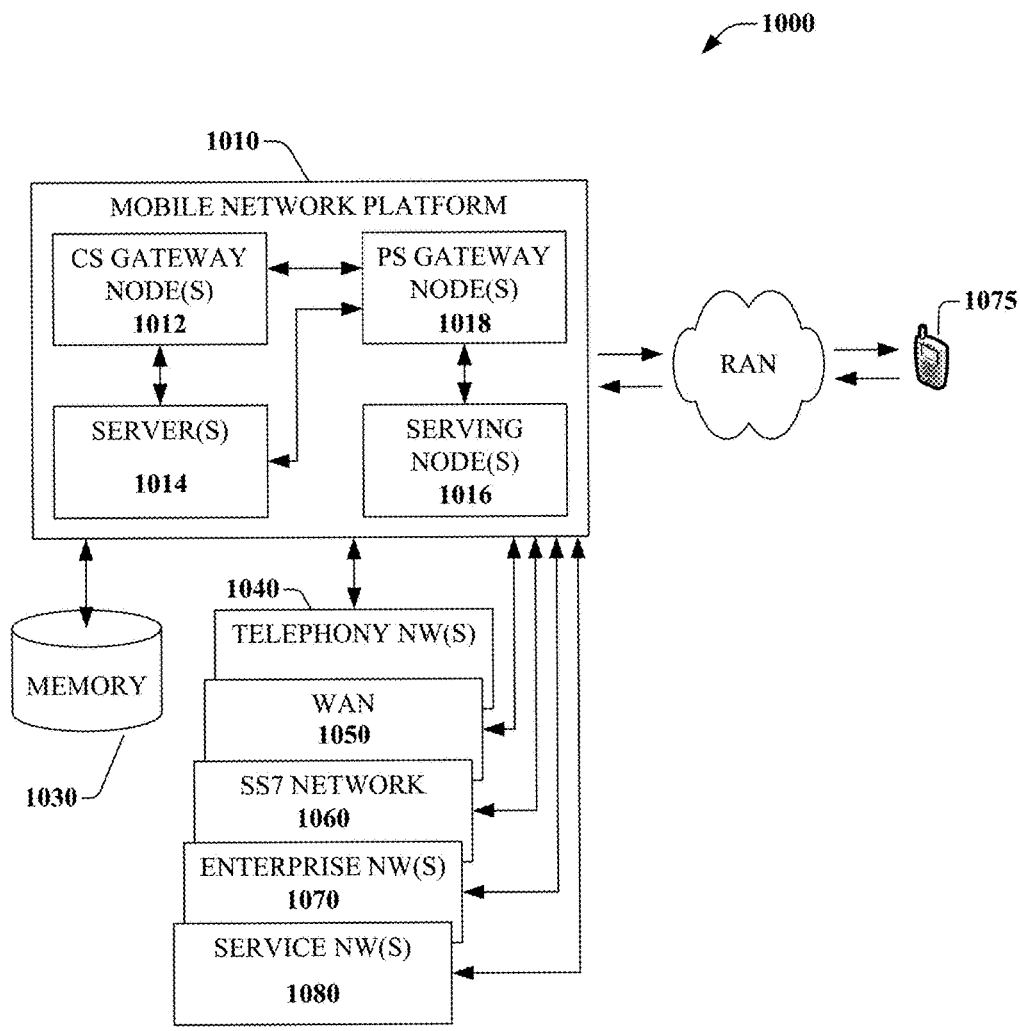
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A telephone adapter, comprising:
   a processor; and
   a memory that stores executable instructions that, when executed by the processor, facilitate performance of operations, comprising:
   receiving a first transmission corresponding to a first telephone communication via a first telephone port;
   receiving a second transmission corresponding to a second telephone communication via a second telephone port, while the first telephone communication is ongoing;
   combining the first transmission and the second transmission into a third transmission corresponding to a cellular protocol; and
   directing the third transmission to a base station device via a radio transmitter device, wherein the third transmission is transmitted via a dedicated bearer and the third transmission comprises first identification information from a subscriber identity module associated with the radio transmitter device, wherein the first identification information facilitates authenticating the third transmission at the base station device, and wherein each of the first transmission and the second transmission comprise respective second and third identification information associated with respective first virtual subscriber identity module and second virtual subscriber identity module that are assigned by a mobile network device associated with the base station device and wherein the first virtual subscriber identity module and the second virtual subscriber identity module facilitate the first telephone communication and the second telephone communication having separate phone numbers.

2. The telephone adapter of claim 1, wherein the operations further comprise:
   assigning a first traffic class and a second traffic class to the first transmission and the second transmission, respectively, and wherein the first traffic class and the second traffic class are associated with respective quality of service requirements.

3. The telephone adapter of claim 2, wherein the operations further comprise:
assigning the first transmission and the second transmission to dedicated bearers associated with the third transmission, and wherein the dedicated bearers are based on the first traffic class and the second traffic class.

4. The telephone adapter of claim 1, wherein the operations further comprise:
directing the third transmission to a wireless hotspot device comprising the radio device via a connection that is at least one of an ethernet cable, ethernet over powerline, or wireless connection.

5. The telephone adapter of claim 1, wherein the operations further comprise:
receiving a fourth transmission corresponding to a non-telephone data transmission; and
combining the fourth transmission with the third transmission.

6. The telephone adapter of claim 5, wherein the operations further comprise:
assigning a third traffic class to the fourth transmission, and wherein the third traffic class of service corresponds to data traffic.

7. The telephone adapter of claim 5, wherein the operations further comprise:
receiving the fourth transmission via a first band of a wireless connection; and
transmitting the third transmission to the radio device via a second band of the wireless connection.

8. A wireless hotspot device, comprising:
a processor; and
a memory that stores executable instructions that, when executed by the processor, facilitate performance of operations, comprising:
receiving a transmission comprising a first voice communication and a second voice communication, wherein the first voice communication and the second voice communication are respectively associated with a first telephone device and second telephone device;
converting the transmission to a cellular transmission conforming to a cellular protocol; and
transmitting the cellular transmission to a base station device using a dedicated bearer via a radio transmitter, wherein the cellular transmission comprises first identification information from a subscriber identity module associated with the radio transmitter, wherein the first identification information facilitates authenticating the cellular transmission at the base station device, and wherein each of the first voice communication and the second voice communication comprise respective second and third identification information associated with a respective first virtual subscriber identity module and a second virtual subscriber identity module that are assigned by a mobile network device associated with the base station device, and wherein the first virtual subscriber identity module and the second virtual subscriber identity module facilitate the first voice communication and the second voice communication being associated with separate phone numbers.

9. The wireless hotspot device of claim 8, wherein the dedicated bearer has a guaranteed bitrate.

10. The wireless hotspot device of claim 9, wherein the operations further comprise:
requesting an increase in the guaranteed bitrate in response to an increase in a number of active voice communications.

11. The wireless hotspot device of claim 10, wherein a requested guaranteed bitrate corresponds to a bitrate of the active voice communications plus a predetermined additional bitrate.

12. The wireless hotspot device of claim 8, wherein the transmission is received from a telephone adapter.

13. The wireless hotspot device of claim 12, wherein the transmission is received via a wired connection with the telephone adapter.

14. The wireless hotspot device of claim 12, wherein the transmission is received via a wireless connection with the telephone adapter.

15. The wireless hotspot device of claim 8, wherein the operations further comprise:
authenticating the cellular transmission with a cellular network based on a subscriber identity module card communicably coupled to the wireless hotspot device.

16. The wireless hotspot device of claim 8, wherein the operations further comprise:
receiving a wireless transmission corresponding to a data communication;
converting the wireless transmission to a second cellular transmission corresponding to the cellular protocol; and
transmitting the second cellular transmission on another dedicated bearer with a non-guaranteed bitrate.

17. The wireless hotspot device of claim 8, wherein the operations further comprise:
sending location data to the base station device, the location data representing a location of the wireless hotspot device, and received via a global positioning system device communicably coupled to the wireless hotspot device.

18. A method, comprising:
receiving, by a device comprising a processor, a transmission from a telephone adaptor, wherein the transmission comprises voice calls associated with respective telephone devices;
assigning, by the device, the voice calls to a dedicated bearer on a radio access network; and
transmitting, by the device, the transmission to a base station device associated with the radio access network on the dedicated bearer via a radio transmitter, wherein the transmission comprises first identification information from a subscriber identity module associated with the radio transmitter, wherein the first identification information facilitates authenticating the transmission at the base station device, and wherein a first voice call of the voice calls and a second voice call of the voice calls comprise respective second and third identification information associated with a respective first virtual subscriber identity module and a second virtual subscriber identity module that are assigned by a mobile network device associated with the base station device, and wherein the first virtual subscriber identity module and the second virtual subscriber identity module facilitate the first voice call and the second voice call being associated with different phone numbers.

19. The method of claim 18, further comprising:
determining, by the device, that there is an increase in a number of voice calls;

determining, by the device, that in response to the increase in the number of voice calls, there are an insufficient number of voice channels on the dedicated bearer; and requesting, by the device, an increase in a guaranteed bit rate associated with the dedicated bearer.

20. The method of claim 18, further comprising:

authenticating, by the device, the cellular transmission with a cellular network based on subscriber identity module information associated with a subscriber identity.

* * * * *